United States Patent [19]

Altebarmakian

[11] Patent Number: 5,813,744
[45] Date of Patent: Sep. 29, 1998

[54] AIRCRAFT GROUND FLOODLIGHT

[75] Inventor: Krikor Altebarmakian, Long Beach, Calif.

[73] Assignee: McDonnell Douglas Corp., Hazelwood, Mo.

[21] Appl. No.: 819,849

[22] Filed: Mar. 17, 1997

[51] Int. Cl.⁶ ...................................................... B64D 47/02
[52] U.S. Cl. .............................. 362/62; 362/364; 244/1 R
[58] Field of Search ............................... 362/62, 364, 1 R, 362/80; 244/118.1, 119, 129.1

[56] References Cited

U.S. PATENT DOCUMENTS

| 1,604,213 | 10/1926 | Zorger . |
| 1,845,153 | 2/1932 | Hyatt . |
| 1,943,609 | 1/1934 | Hyatt . |
| 1,996,126 | 4/1935 | Sipp . |
| 2,257,127 | 9/1941 | Roper et al. . |
| 2,938,686 | 5/1960 | Van Winkle et al . |
| 3,096,024 | 7/1963 | Young . |
| 3,988,609 | 10/1976 | Lewin . |
| 4,530,576 | 7/1985 | Penelli et al. . |
| 4,823,246 | 4/1989 | Dilouya . |
| 4,934,798 | 6/1990 | Bunch . |
| 4,936,666 | 6/1990 | Futhey . |
| 5,022,740 | 6/1991 | Maziorka . |
| 5,106,038 | 4/1992 | DuPont ............................ 244/118.1 X |
| 5,585,968 | 12/1996 | Guhman et al. . |

FOREIGN PATENT DOCUMENTS 644816  5/1991  Australia .

Primary Examiner—Ira S. Lazarus
Assistant Examiner—Nhat-Hang H. Lam
Attorney, Agent, or Firm—Brooks & Kushman PC

[57] ABSTRACT

A ground floodlight for an aircraft having a fuselage including a forward cargo door includes a generally flat lens having a first region for directing light toward the front cargo door and a second region for directing light generally forward to illuminate ground in front of the aircraft. The lens is generally flat and smooth and is adapted for flush mounting in the fuselage. A corresponding method for improving ground floodlight illumination includes directing light generated from a lamp within the fuselage in an outward direction and then redirecting first and second portions of the light toward the front cargo door and the ground in front of the aircraft, respectively.

12 Claims, 2 Drawing Sheets

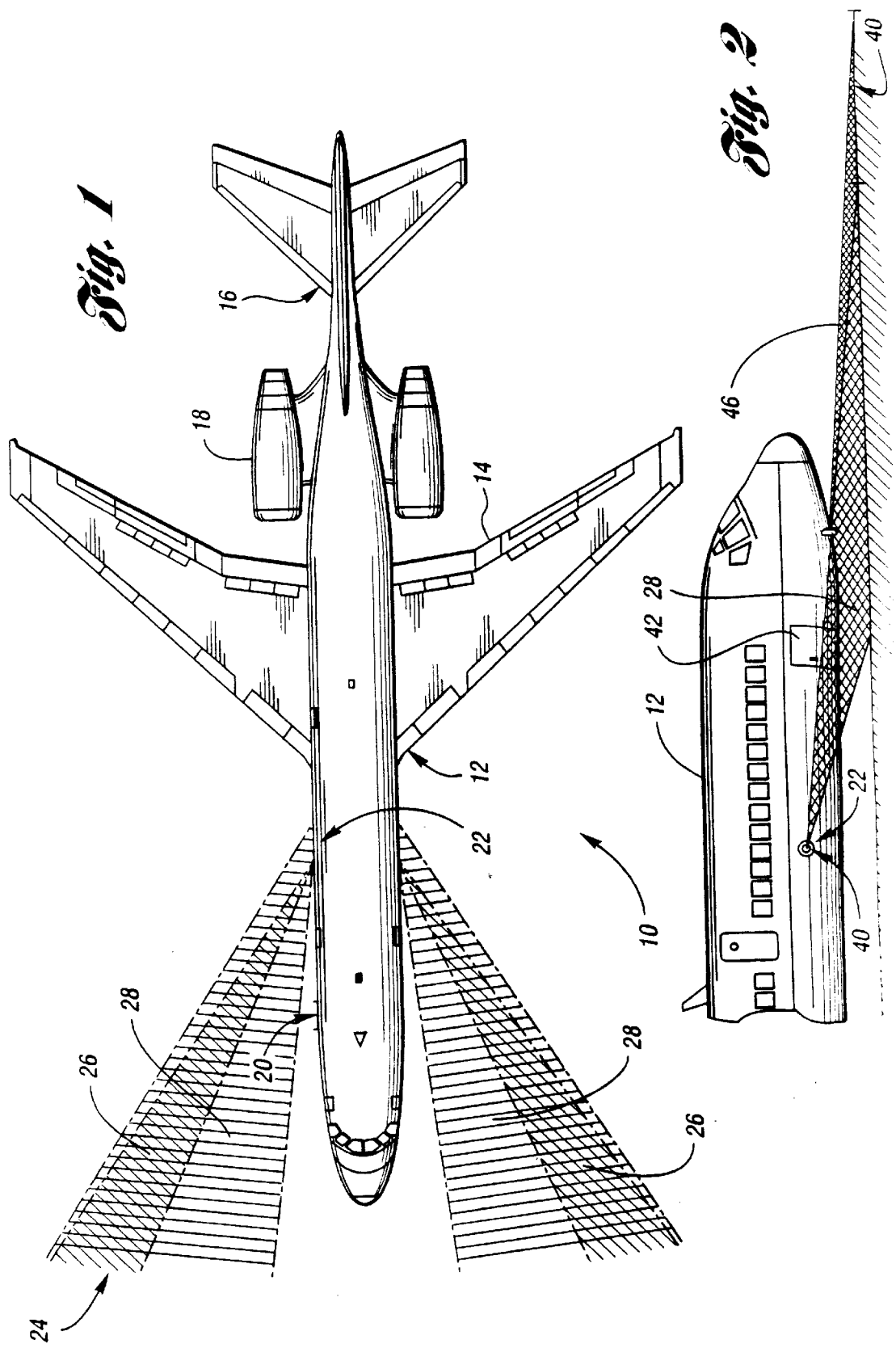

AIRCRAFT GROUND FLOODLIGHT

TECHNICAL FIELD

The present invention relates to an aircraft ground floodlight having a lens for improving illumination of a selected area about the aircraft.

BACKGROUND ART

Aircraft ground floodlights are generally used by the pilot to illuminate the ground in front of the aircraft during taxiing. These lights also provide some level of illumination for the ground crew while performing various pre-flight and post-flight operations, such as cargo loading or unloading. While many airports provide exterior lighting to improve night visibility for the ground crew, various locations or applications rely upon the ground floodlights as the primary source of such illumination. As such, it is desirable to improve the illumination provided by the ground floodlights for selected areas about the aircraft to facilitate ground-based operations such as cargo loading or unloading.

Due to aerodynamic considerations, the ground floodlights are generally mounted within the fuselage of the aircraft. The ground floodlights include a lens having a smooth, relatively flat outer surface mounted flush with the fuselage. Because the desired areas of illumination are generally toward the front of the aircraft relative to the position of the ground floodlight, the generated light must be redirected from an outwardly or transverse direction toward the desired illumination area. Prior art systems and methods position the lamp of the floodlight at an angle relative to the fuselage and use a lens to direct the light toward the ground in front of the aircraft. While the prior art systems and methods provide adequate illumination for the pilot during taxiing, increased illumination may increase efficiency for various ground-based operations such as forward cargo loading and unloading.

While additional lighting or a larger floodlight could be added to improve illumination of the forward cargo door area, it is desirable to improve illumination without significantly impacting the weight, cost, or power consumption of the aircraft.

DISCLOSURE OF THE INVENTION

As such, an object of the present invention is to improve illumination provided by a ground floodlight of an aircraft without significantly impacting the cost, weight, or power consumption of the aircraft.

In carrying out the above object and other objects, features, and advantages of the invention, a ground floodlight is provided for improving illumination of a forward cargo door of an aircraft. The floodlight includes a housing adapted for mounting to the fuselage of the aircraft. A lamp mounted in the housing at an angle relative to the fuselage directs light in a direction generally outward or transverse relative to the fuselage. The light impinges on a generally flat lens which is adapted for flush mounting to the fuselage. The lens includes a first region for directing light from the lamp toward the forward cargo door area and a second region for directing light from the lamp generally forward to illuminate ground in front of the aircraft. In one embodiment, the lens includes a third region substantially identical to the second region and the first region is interposed the second and third regions.

A method for improving ground floodlight illumination for selected areas of an aircraft is also disclosed. The method includes directing light generated from within the fuselage in a generally outward direction relative to the aircraft, redirecting a first portion of the light in a generally forward direction at a first angle relative to the fuselage to illuminate ground in front of the aircraft, and redirecting a second portion of the light in a generally forward direction at a second angle relative to the fuselage to improve illumination of the forward cargo door, the second angle being less than the first angle. Preferably, the steps of redirecting the light are effected by a single optical element.

Numerous advantages are associated with the present invention. For example, the present invention utilizes a single lens to provide increased illumination to selected areas about the aircraft without significant additional cost, weight, or power consumption. Furthermore, the present invention maintains or improves ground visibility for pilots while taxiing and improves illumination of the forward cargo loading door.

While embodiments of this invention are illustrated and disclosed, these embodiments should not be construed to limit the claims. It is anticipated that various modifications and alternative designs may be made without departing from the scope of this invention.

BRIEF DESCRIPTION OF THE DRAWINGS

FIG. 1 is a plan view illustrating an improved illumination pattern for an aircraft equipped with ground floodlights according to the present invention;

FIG. 2 is a partial side view of an aircraft having a ground floodlight according to the present invention;

DETAILED DESCRIPTION OF THE INVENTION

Figure 3:
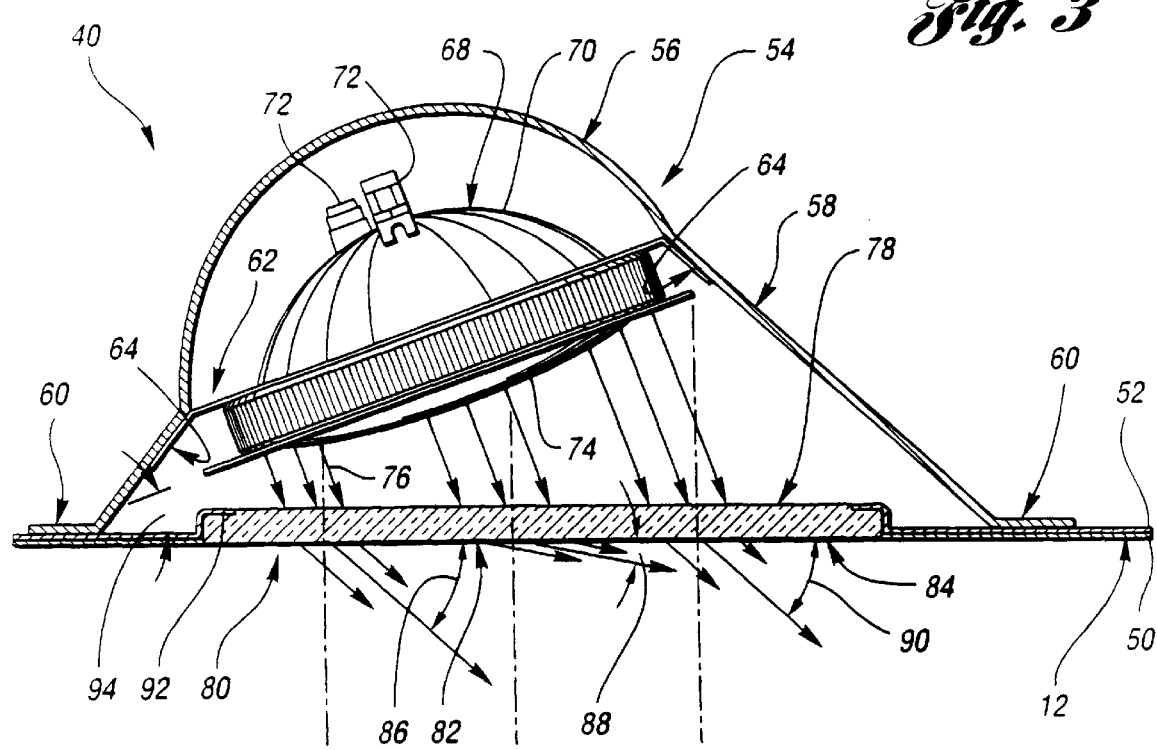
FIG. 3 is a partial cross-sectional view of a ground floodlight installed in the fuselage of an aircraft according to the present invention.

Referring now to FIG. 1, a plan view of an aircraft 10 having a ground floodlight according to the present invention is shown. Aircraft 10 includes a fuselage, generally indicated by reference numeral 12, wings 14, a tail section 16, and engines 18. Aircraft 10 includes an area of desired illumination, such as front cargo door area 20. Illumination is provided by a ground floodlight which is preferably positioned within a source area 22 which is approximately 36–38 feet aft relative to front cargo door area 20. Of course, optimal positioning of source area 22 may vary depending upon the particular aircraft, application, position of desired illumination area 20, and other factors. In the present embodiment of the invention, the ground floodlights were moved about 19 inches aft relative to front cargo door area 20 to accommodate larger water tanks within fuselage 12.

FIG. 1 also illustrates an illumination footprint or pattern 26 provided by a prior art ground floodlight positioned within source area 22. The prior art ground floodlights include a lens characterized by a single angle of refraction. The resulting illumination pattern 26 passes within about 12 feet from front cargo door area 20 at its closest point. An improved illumination pattern 28 is provided by ground floodlights according to the present invention. Improved illumination pattern 28 passes within about 4–6 feet of front cargo door area 20 at its closest point. While it is desirable to closely match the illumination pattern with the desired illumination areas, competing factors such as total power consumption, available candle power, packaging, and the like often require some compromise. Illumination pattern 28 was empirically determined in implementing the present invention to provide an acceptable level of illumination for the particular tasks of loading and unloading via the front cargo door. As such, the present invention provides improved illumination for selected areas about the aircraft, such as front cargo door area 20, while maintaining or improving ground visibility for the pilot.

A partial side view of an aircraft utilizing a ground floodlight according to the present invention is illustrated in FIG. 2. Front landing gear and other unnecessary details are not specifically shown for clarity. Fuselage 12 includes a ground floodlight 40 for illuminating a front cargo door 42 according to the present invention. Ground floodlight 40 is positioned within source area 22 providing an illumination pattern 28. A first portion 44 of illumination pattern 28 preferably passes within about 4 feet of cargo door 42 as described above to provide adequate lighting during loading and unloading of the aircraft cargo. A second portion 46 of illumination pattern 28 illuminates the ground in front of the aircraft, as indicated generally by reference numeral 48. Second portion 46 provides night visibility for the pilot during taxiing.

Referring now to FIG. 3, a partial cross-section is shown illustrating an installed ground floodlight 40 according to the present invention. Ground floodlight 40 is preferably mounted within fuselage 12 which generally includes an outer layer or skin 50 and an inner layer 52. Floodlight 40 includes a housing 54 adapted for mounting to fuselage 12. Housing 54 preferably comprises an integral hemispherical portion 56 which blends into a frustoconical portion 58 terminating in a flange 60. In one embodiment, flange 60 is permanently attached to inner layer 52 of fuselage 12 within source area 22. Preferably, housing 54 is positioned about 37.5 feet aft relative to front cargo door 42. Housing 54 may also be referred to as a "pressure can" since it provides pressure isolation of the interior of fuselage 12 from atmosphere. Hemispherical portion 56 includes apertures with appropriate seals (not shown) to accommodate electrical wires to power ground floodlight 40.

Housing 54 also includes a lamp retaining member 62 having a flange 64 attached to frustoconical portion 58. Lamp retaining member 62 generally spans hemispherical portion 56 and includes a generally circular aperture adapted for receiving a lamp 68. As illustrated, lamp 68 is preferably disposed within housing 54 at a non-perpendicular (or non-parallel) angle relative to fuselage 12. In this embodiment, lamp 68 forms an angle of about 20° relative to fuselage 12. A bowl 70 reflects light generated by a filament (not shown) spanning electrical connectors 72. Preferably, bowl 70 cooperates with a transparent cover 74 such that light rays 76 emerge substantially parallel across the surface of cover 74. Prior to impinging upon lens 78, light rays 76 propagate in a generally outward direction relative to fuselage 12. Light rays 76 are then redirected in a generally forward or lateral direction relative to fuselage 12 as explained in greater detail below.

Of course, electrical, illumination, mounting angle, and other specifications for lamp 68 may vary depending upon the particular aircraft and application. However, in a preferred embodiment of the present invention, lamp 68 is a 450 Watt halogen lamp operating at 25 Volts in a model MD-80 aircraft manufactured by the assignee of the present invention. A lamp, such as lamp 68, for use according to the present invention may be purchased from Devor Aviation Corporation of Albuquerque, N. Mex.

With continuing reference to FIG. 3, lens 78 is generally flat and smooth due to aerodynamic considerations. Depending upon the particular mounting location of lens 78 on fuselage 12, the outer surface of lens 78 may have a slight radius which matches any curvature of fuselage 12 at the installed location. Lens 78 includes a first region 80 for directing light rays 76 from lamp 68 toward forward cargo door 42, best shown in FIG. 2. A second region 82 directs light rays 76 from lamp 68 generally forward to illuminate ground in front of the aircraft as illustrated and described with reference to FIG. 2. Lens 78 may also include a third region 84 which has substantially identical optical properties as those exhibited by first region 80.

As also illustrated in FIG. 3, first region 80 redirects light generated by lamp 68 within fuselage 12 from a generally outward direction relative to aircraft 10 to a generally forward direction at a first exit angle 86. Similarly, second region 82 redirects a second portion of the light in a generally forward direction at a second exit angle 88 relative to fuselage 12 to improve illumination of the forward cargo door. Third region 84 also redirects a portion of the light, preferably in a generally forward direction parallel to the light emerging from first region 80, at a third exit angle 90. Angles 86, 88, and 90 may be measured relative to normal or perpendicular incidence as shown in which case second angle 88 is preferably greater than first angle 86 and third angle 90. Stated using the complementary angles measured relative to fuselage 12, the complement to second angle 88 is preferably smaller than the complements of first angle 86 and third angle 90. In the present embodiment of the invention, suitable angles were determined empirically by measuring illumination levels at four feet intervals away from the front cargo door. The resulting angles which provided sufficient illumination for loading and unloading via the forward cargo door were determined to be about 51° for first and third angles 86 and 90 and about 64° for second angle 88.

The present invention is independent of the particular optical phenomena employed to redirect portions of the light to selected areas about the aircraft provided lens 78 meets the various other objectives described herein. Any of a number of methodologies may be employed to produce an optical element which provides the features and advantages of the present invention as will be appreciated by one of ordinary skill in the art. In the present embodiment of the invention, lens 68 is manufactured by Kopp Glass Corporation of 2108 Palmer Street in Pittsburgh, Pa. Due to the heat generated by lamp 68, lens 78 is preferably a glass having suitable optical and thermal properties or other similar material capable of withstanding the wide range of operating temperatures and pressures typically experienced by aircraft whether ground-based or at altitude.

As also shown in FIG. 3, lens 78 preferably includes a recessed perimeter 92 to facilitate mounting of lens 78 between outer layer or skin 50 and inner layer 52 of fuselage 12. Recessed perimeter 92 is preferably sized such that the outer surface of lens 78 is substantially flush with outer layer or skin 50 of fuselage 12. Of course, other mounting arrangements may be utilized without departing from the spirit or scope of the present invention.

Figure 4:
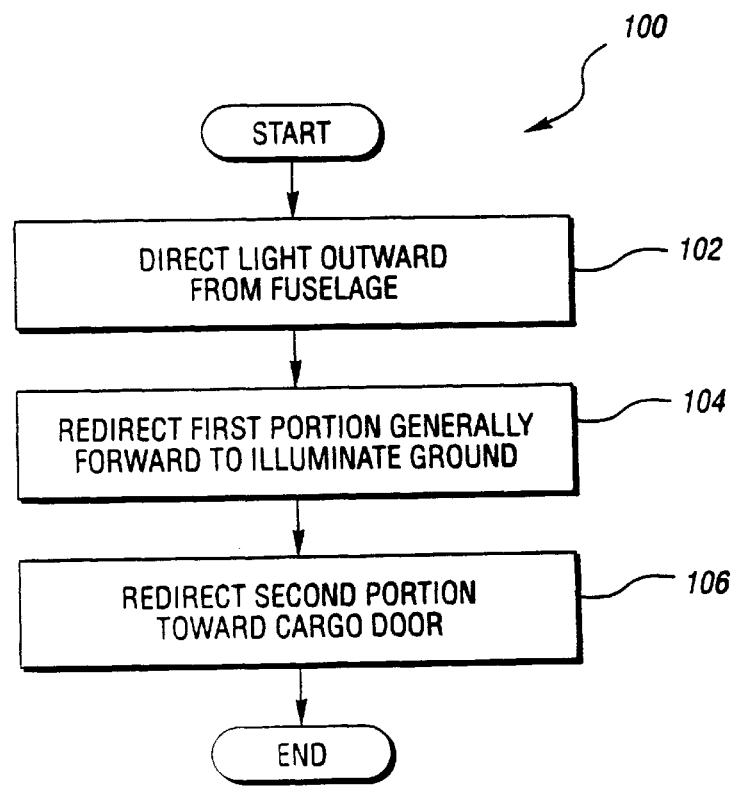
FIG. 4 is a flow chart illustrating a method for improving illumination of a selected area about an aircraft according to the present invention.

Referring now to FIG. 4, an alternative representation of the present invention is shown. Flowchart 100 illustrates the steps of a method for improving ground floodlight illumination according to the present invention. Block 102 represents the step of directing light generated from a lamp within the fuselage in a generally outward direction relative to the aircraft. For example, appropriate positioning of a lamp within the fuselage would perform such a step. Block 104 represents the step of redirecting a first portion of the light to a generally forward direction at a first angle relative to the fuselage. Preferably, the first portion of the light is redirected to illuminate ground in front of the aircraft. Block 106 represents the step of redirecting at least a second portion of the light in a generally forward direction at a second angle relative to the fuselage where the second angle is less than the first angle. The second portion of the light is preferably utilized to improve illumination of the forward cargo door of the aircraft. In one embodiment of the present invention, the first portion of the light is redirected at an angle of about 40° relative to the fuselage of the aircraft while the second portion of the light is redirected at an angle of about 25° relative to the fuselage.

Thus, the present invention provides increased illumination to selected areas about the aircraft without significant additional cost, weight, or power consumption by utilizing a ground floodlight with a lens having multiple regions each directing light to at least one of the selected areas. In the preferred embodiment, the present invention maintains or improves ground visibility for pilots during taxiing while also improving illumination of the forward cargo loading door to reduce the reliance upon ground-based lighting.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A ground floodlight for an aircraft having a fuselage including a forward cargo door, the ground floodlight comprising:

a housing adapted for mounting to the fuselage;

a lamp connected to the housing at an angle relative to the fuselage; and a generally flat lens for mounting substantially flush with an outer surface of the fuselage, the lens having a first region for directing light from the lamp toward the forward cargo door to illuminate an area beginning about four feet from the cargo door to provide adequate lighting during loading and unloading of the aircraft and a second region for directing light from the lamp generally forward to illuminate ground in front of the aircraft.

2. The ground floodlight of claim 1 wherein the lens includes a third region substantially identical to the second region and wherein the first region is interposed the second and third regions.

3. The ground floodlight of claim 1 wherein the first region of the lens directs parallel rays of light from the lamp to form an exit angle of about 65 degrees relative to a normal from the fuselage.

4. The ground floodlight of claim 1 wherein the housing comprises:

a hemispherical portion which blends into a frustoconical portion having a flange at the base thereof for mounting to the fuselage; and a lamp retaining member having a flange attached to the frustoconical portion, the retaining member generally spanning the hemispherical portion and including a generally circular aperture for receiving the lamp.

5. The ground floodlight of claim 1 wherein the lens includes a recessed perimeter for mounting to the fuselage.

6. A ground floodlight for an aircraft having a fuselage including a forward cargo door, the ground floodlight including a housing mounted to the fuselage and a lamp disposed within the housing at an angle relative to the fuselage, the ground floodlight comprising:

a generally smooth lens including a perimeter mounted to the fuselage, the lens having a first region for directing light from the lamp toward the forward cargo door to at least an area within about four feet from the forward cargo door to increase illumination during loading and unloading of cargo and a second region for directing light from the lamp generally forward to illuminate ground in front of the aircraft.

7. The ground floodlight of claim 6 wherein the lens includes a third region for directing light from the lamp generally parallel to light directed by the second region, the first region being interposed the second and third regions.

8. The ground floodlight of claim 6 wherein the lens is mounted substantially flush with the fuselage.

9. A method for improving ground floodlight illumination for an aircraft having a fuselage with a forward cargo door, the method comprising:

directing light generated from within the fuselage in a generally outward direction relative to the aircraft;

redirecting a first portion of the light in a generally forward direction at a first angle relative to the fuselage to illuminate ground in front of the aircraft; and redirecting a second portion of the light in a generally forward direction at a second angle relative to the fuselage to improve illumination of the forward cargo door, the second angle being less than the first angle.

10. The method of claim 9 wherein the redirecting steps are effected by a single optical element.

11. The method of claim 9 wherein the step of redirecting the first portion includes redirecting the first portion at an angle of about 40 degrees relative to the fuselage.

12. The method of claim 11 wherein the step of redirecting the second portion includes redirecting the second portion at an angle of about 25 degrees relative to the fuselage.

* * * * *